(12) United States Patent
Loewen et al.

(10) Patent No.: US 9,406,407 B2
(45) Date of Patent: Aug. 2, 2016

(54) RADIOACTIVE CAPTURE SYSTEM FOR SEVERE ACCIDENT CONTAINMENT OF LIGHT WATER REACTORS (LWRS), AND METHOD THEREOF

(71) Applicants: Eric P. Loewen, Wilmington, NC (US); Jose Maria Caro, Wilmington, NC (US); Derek Bass, Wilmington, NC (US)

(72) Inventors: Eric P. Loewen, Wilmington, NC (US); Jose Maria Caro, Wilmington, NC (US); Derek Bass, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 861 days.

(21) Appl. No.: 13/710,766

(22) Filed: Dec. 11, 2012

(65) Prior Publication Data
US 2014/0161218 A1 Jun. 12, 2014

(51) Int. Cl.
| | |
|---|---|
| *G21C 19/42* | (2006.01) |
| *G21C 9/00* | (2006.01) |
| *G21C 19/307* | (2006.01) |
| *G21C 9/004* | (2006.01) |
| *G21C 13/10* | (2006.01) |
| *G21C 19/30* | (2006.01) |

(Continued)

(52) U.S. Cl.
CPC ...... *G21C 9/00* (2013.01); *G21C 9/001* (2013.01); *G21C 9/004* (2013.01); *G21C 13/10* (2013.01); *G21C 19/30* (2013.01); *G21C 19/307* (2013.01); *G21D 1/00* (2013.01); *G21D 3/04* (2013.01); *Y02E 30/40* (2013.01)

(58) Field of Classification Search
CPC ............ G21C 9/00; G21C 9/02; G21C 9/027; G21C 9/033; G21C 15/18; G21D 3/04
See application file for complete search history.

(56) References Cited

U.S. PATENT DOCUMENTS

| | | | |
|---|---|---|---|
| 3,338,665 A | | 8/1967 | Silverman |
| 3,712,851 A | * | 1/1973 | Isberg et al. ............ G21C 9/00 376/273 |
| 3,889,707 A | * | 6/1975 | Fay ..................... B01J 19/002 137/251.1 |

(Continued)

FOREIGN PATENT DOCUMENTS

| | | |
|---|---|---|
| EP | 0859671 A1 | 8/1998 |
| GB | 862624 A | 3/1961 |

(Continued)

OTHER PUBLICATIONS

Search Report dated Sep. 30, 2013 by the European Patent Office for Application No. 13173987.2.

(Continued)

*Primary Examiner* — Marshall O'Connor
(74) *Attorney, Agent, or Firm* — Harness, Dickey & Pierce, P.L.C.

(57) ABSTRACT

A system and a method for capturing gaseous, particulate and liquid radioactive material released from primary containment of a Light Water Reactor (LWR) during severe accident conditions. The system includes a below-grade media area, connected to a reactor pressure vessel (RPV) and portions of primary containment, providing varying levels of adsorption/absorption of the radioactive material. The media area is located on-site to offer a passive, self-regulating structure for stabilizing a nuclear reactor. The capture system provides for liquid drainage and gaseous venting of the radioactive material, and a treatment capable of treating the media following stabilization of the reactor.

33 Claims, 11 Drawing Sheets

(51) Int. Cl.
   *G21D 1/00* (2006.01)
   *G21D 3/04* (2006.01)

(56) References Cited

U.S. PATENT DOCUMENTS

| | | | |
|---|---|---|---|
| 3,958,630 | A | 5/1976 | Smith |
| 4,151,689 | A | 5/1979 | Schabert |
| 4,859,405 | A | 8/1989 | Squarer et al. |
| 5,295,170 | A | 3/1994 | Schulz |
| 6,351,936 | B1 | 3/2002 | Bröckerhoff et al. |
| 9,044,737 | B2 | 6/2015 | Mori et al. |
| 2004/0182791 | A1 | 9/2004 | Kuhn et al. |
| 2013/0039822 | A1 | 2/2013 | Hasan |
| 2013/0140005 | A1* | 6/2013 | Tietsch .......... G21C 9/012 165/104.21 |

FOREIGN PATENT DOCUMENTS

| | | |
|---|---|---|
| JP | S5316191 A | 2/1978 |
| JP | 56 051246 | 5/1981 |
| JP | S5899790 A | 6/1983 |
| JP | 58184597 A | 10/1983 |
| JP | S59112295 A | 6/1984 |
| JP | H01159016 A | 6/1989 |
| JP | H04344495 A | 12/1992 |
| JP | H0534495 A | 2/1993 |
| JP | 09054195 | 2/1997 |
| JP | H0961577 A | 3/1997 |
| JP | 2000111692 A | 4/2000 |
| JP | 2012002606 A | 1/2012 |
| JP | 2012230078 A | 11/2012 |
| KR | 2005-0010734 | 1/2005 |
| KR | 20050010734 | 1/2008 |
| WO | WO-9202021 A1 | 2/1992 |

OTHER PUBLICATIONS

Sher, R. et al. "Transport and Removal of Aerosols in Nuclear Power Plants Following Severe Accidents"; American Nuclear Society, 2011.

"Alternative Radiological Source Terms for Evaluating Design Basis Accidents at Nuclear Power Reactors"; Regulatory Guide 1.183, pp. 12-15; U.S. Nuclear Regulatory Commision, Office of Nuclear Regulatory Research; Jul. 2000.

"100.11 Determination of exclusion area, low population zone, and population center distance"; Title 10 of CFR 100, section 11; U.S. Nuclear Regulatory Commision; Nov. 2012.

'Spent Fuel Heat Generation in an Independent Spent Fuel Storage Installation'; U.S. Nuclear Regulatory Commission (NRC) Reg. Guide 3.54; Mar. 2011.

US Office Action dated May 4, 2015 in related U.S. Appl. No. 13/537,373.

Oberth, et al., "Underground Nuclear Power Plants: State-of-the-Art," *Underground Space*, vol. 5, 1983, pp. 375-383.

* cited by examiner

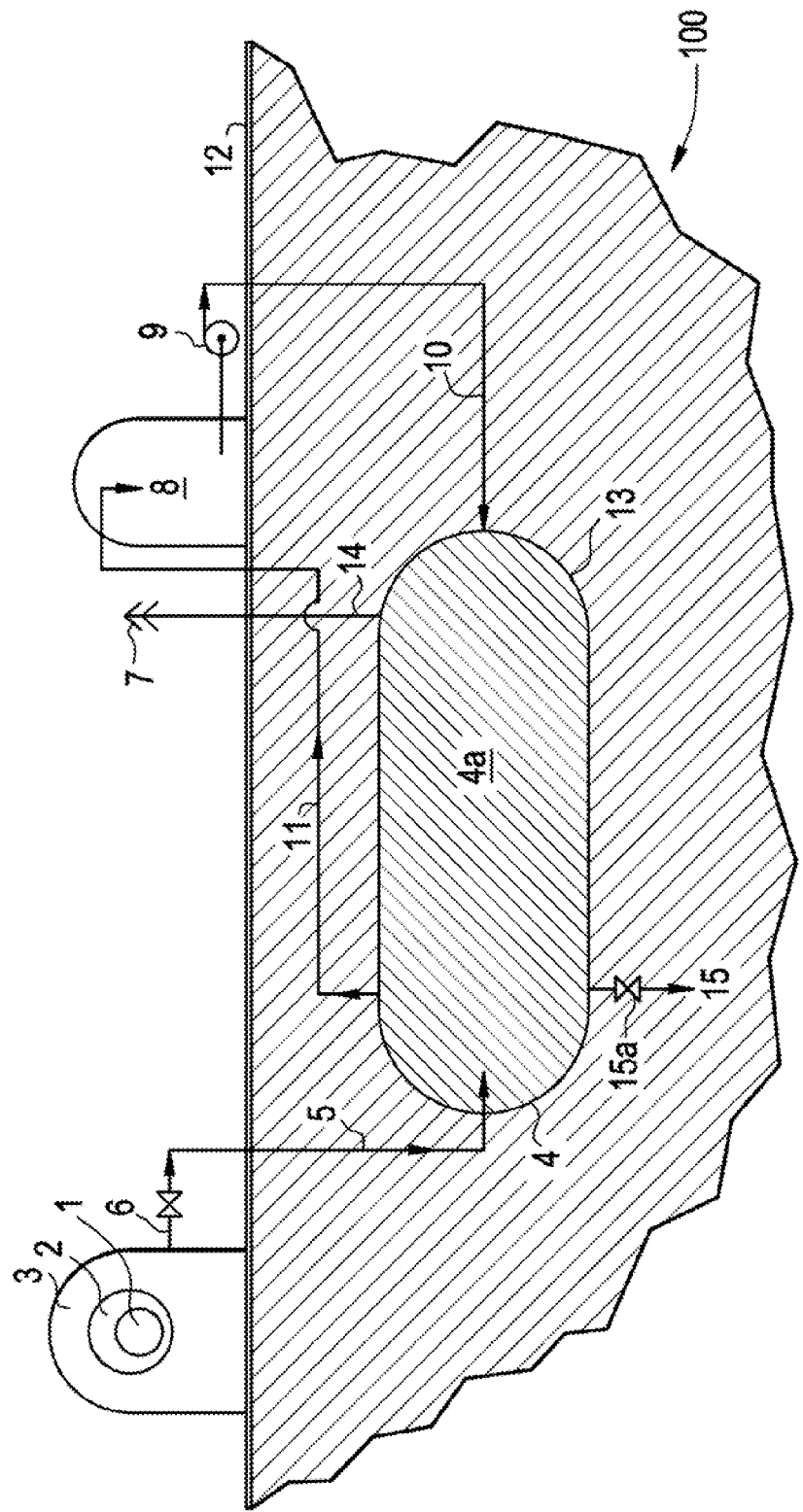

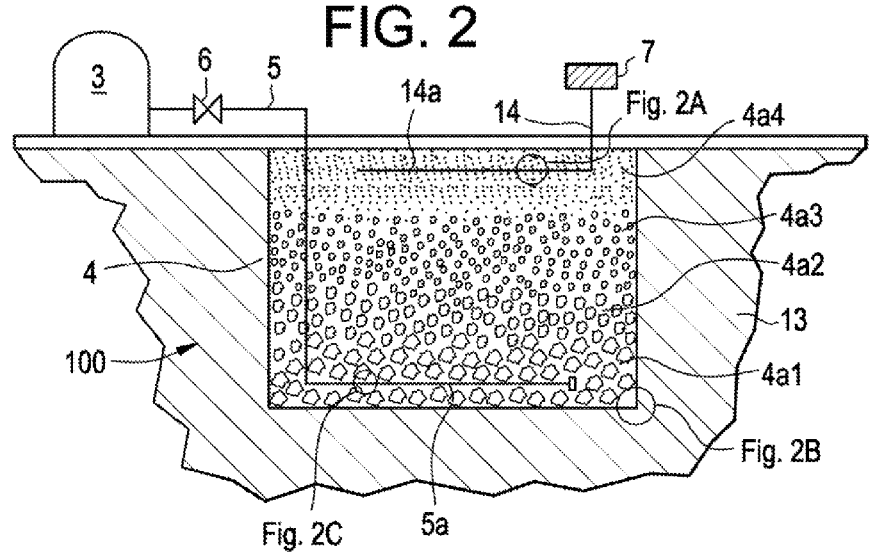
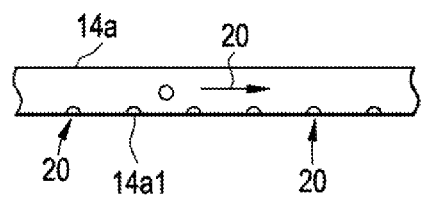
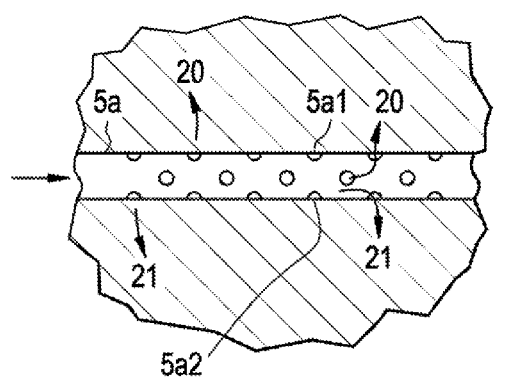
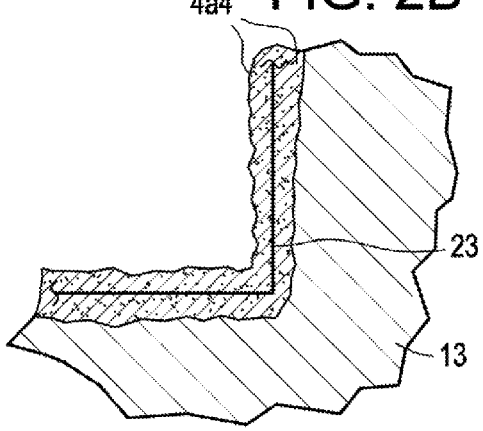

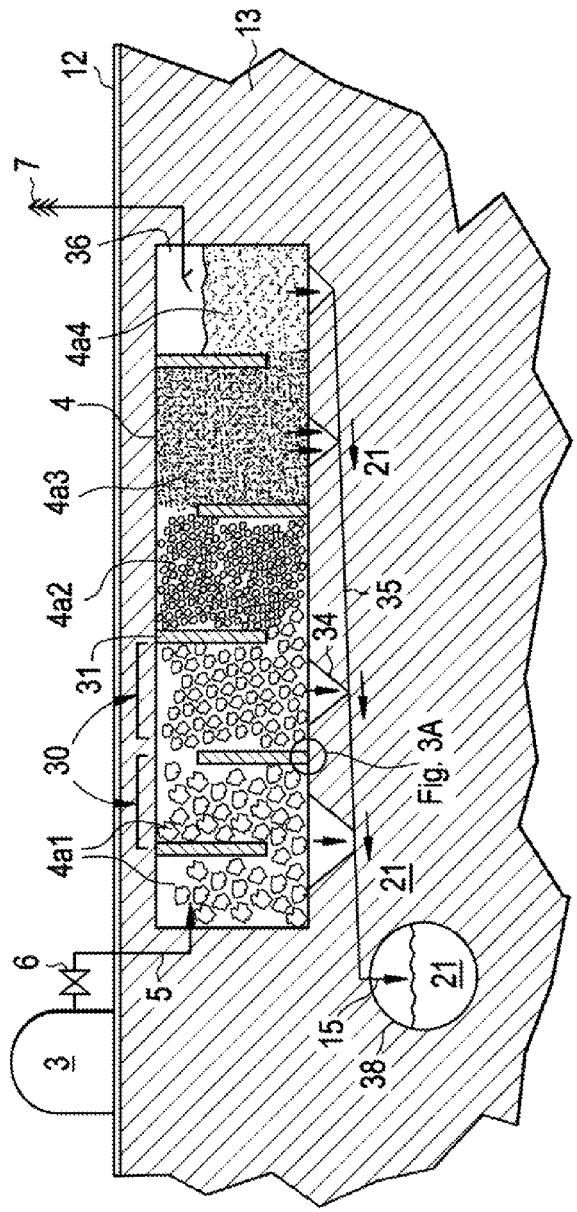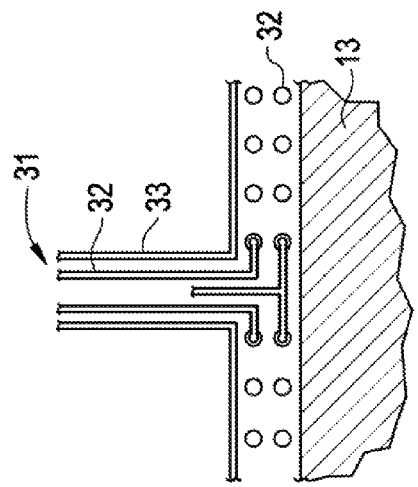

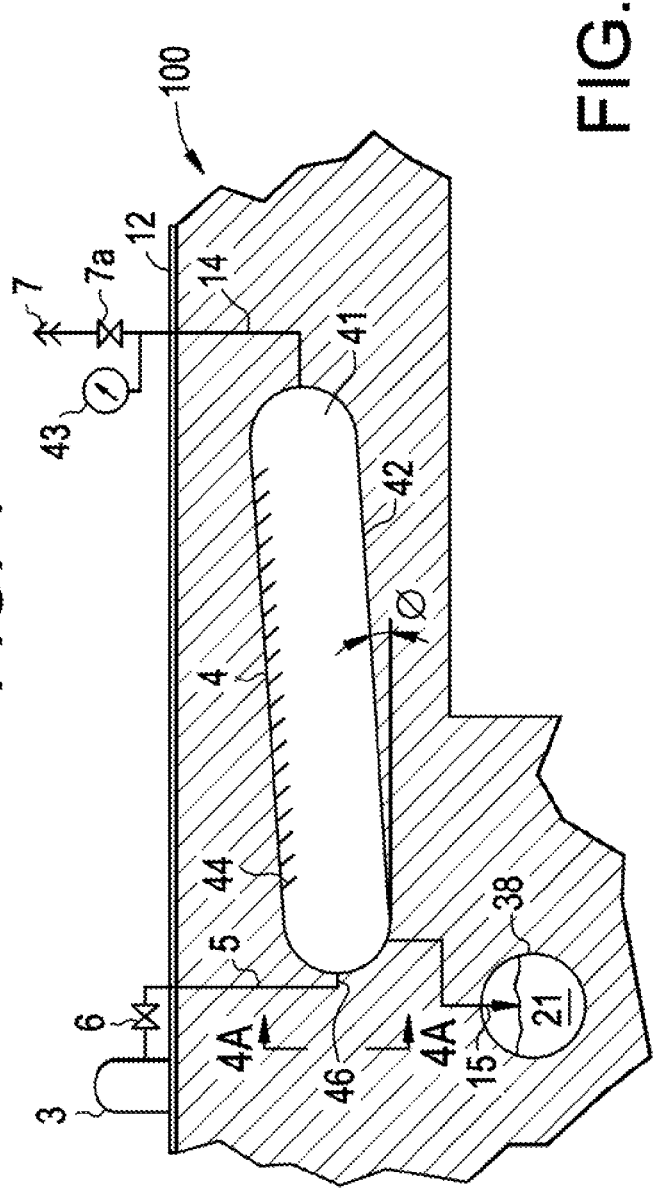
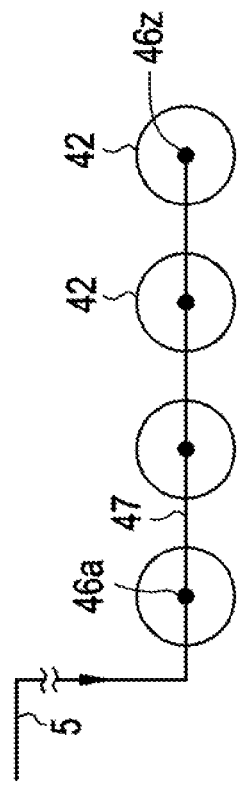

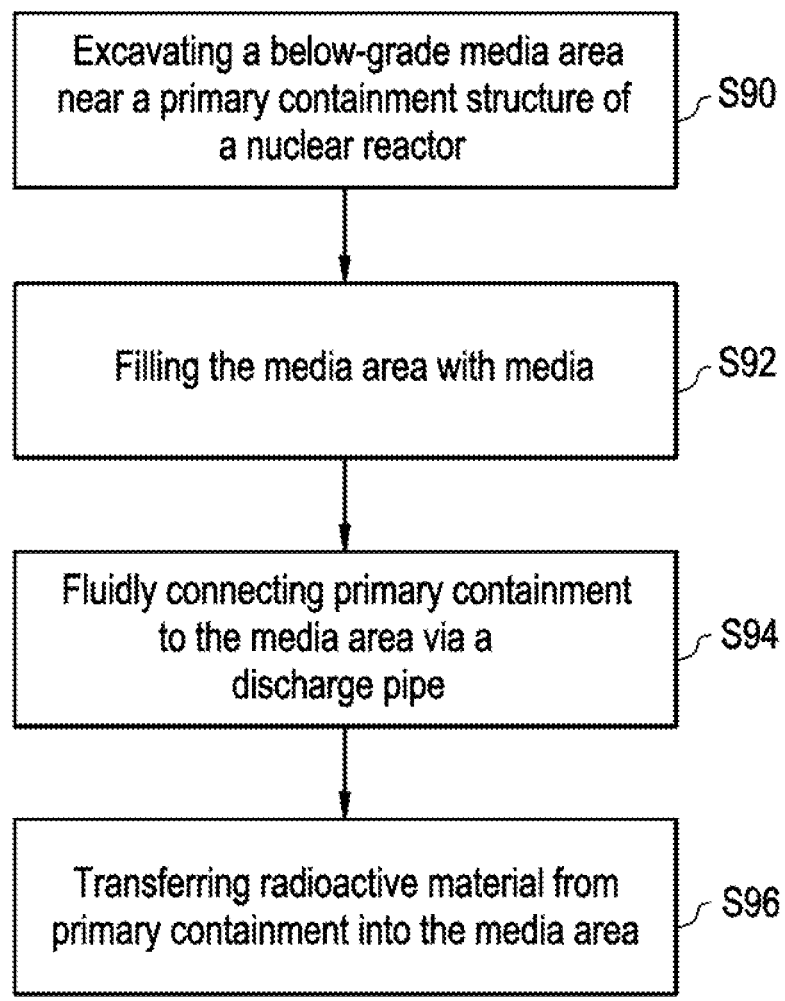

RADIOACTIVE CAPTURE SYSTEM FOR SEVERE ACCIDENT CONTAINMENT OF LIGHT WATER REACTORS (LWRS), AND METHOD THEREOF

BACKGROUND OF THE INVENTION

1. Field of the Invention

Example embodiments relate generally to nuclear Light Water Reactors (LWRs), and more particularly to a system and a method of capturing radioactive material from primary containment during a severe accident. The system may be passive, such that the system may be operated for extended period without the need for monitoring or the application of external electrical power. This system may be considered a filtered venting system or a "filtered vent."

2. Related Art

During a nuclear power accident, nuclear light water reactors (LWR) predominantly rely on a primary containment structure 3 (see FIG. 1) to prevent radioactive materials (gases, liquids and particulates) from being released into the surrounding environment. However, in modern history, three severe nuclear accidents (Chernobyl, The Mile Island, and Fukushima) have involved a release of radioactive materials from primary containment structures of a nuclear plant. Current industry standards also act to prevent the release of radioactive aerosols and iodine from entering the atmosphere through the use of a "filter vent" via the use of a "hardened vent" pipe. Such a filter conventionally uses a wet scrubbing system with charcoal filtering that scrubs radioactive contaminants as exhaust gases flow through the device. However, an above-grade filter device capable of filtering radioactive contaminants may be expensive, and may not guarantee a capture of radioactive material (as the HEPA or charcoal venting filters may become overwhelmed) that may otherwise cause dispersion and widespread environmental contamination.

SUMMARY OF INVENTION

Example embodiments provide a system and a method for a passive capture of radioactive materials that may be applied to commercial nuclear light water reactors (LWRs). The capture system may be located on-site, and may include a below-grade media that offers a controlled absorption of radioactive materials (gases, liquids and particulates) that may be released from primary containment. The release of radioactive materials from primary containment may be performed to reduce the pressure of the reactor pressure vessel (RPV) and primary containment of the LWR to avoid a more serious accident such as an explosion and/or possible structural damage to primary containment that could cause a release of radioactive materials directly into the atmosphere.

Example embodiments may reduce the liability and size of the exclusion area (per Title 10 of Code of Federal Regulation Article 100) by capturing radio-toxins below-grade to prevent or mitigate a major off-site release. Following stabilization of the LWR, the below-grade capture system may concentrate the radioactive materials through a pump-and-treat process. The mechanics of the example embodiments therefore enable a large-volume, below-grade, passive containment overpressure protection preventing an uncontrolled release during beyond-design-basis events.

BRIEF DESCRIPTION OF THE DRAWINGS'

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1A is a diagram of a capture system, in accordance with an example embodiment;

FIG. 2 is a detailed view of a below-grade media area of a capture system, in accordance with an example embodiment;

FIG. 2A is a detailed view of the upper gas outlet pipe portion of FIG. 2, in accordance with an example embodiment;

FIG. 2B is a detailed view of the rubber liner of FIG. 2, in accordance with an example embodiment;

FIG. 2C is a detailed view of the lower discharge pipe portion of FIG. 2, in accordance with an example embodiment;

FIG. 3 is a detailed view of another below-grade media area configuration of a capture system, in accordance with an example embodiment;

FIG. 3A is a detailed view of the baffles of FIG. 3, in accordance with an example embodiment;

FIG. 4 is a detailed view of another below-grade media area configuration of a capture system, in accordance with an example embodiment;

FIG. 4A is a perspective view of a series of tanks manifolded together in parallel, as shown by the capture system of FIG. 4;

FIG. 9 is a flowchart of a method of making and using a capture system, in accordance with an example embodiment.

DETAILED DESCRIPTION

Figure 1B:
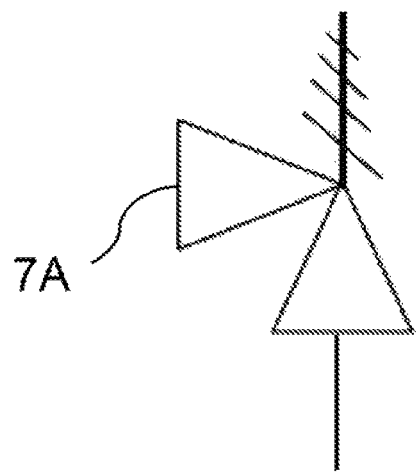
FIG. 1B is a diagram of an alternative venting system, in accordance with an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description oft figures.

It will be understood that, although the terms first, second, etc, may be used herein to describe various elements, these elements should not be limited by these terms. These terms are only used to distinguish one element from another. For example, a first element could be termed a second element, and, similarly, a second element could be termed it first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1A is a diagram of a capture system 100. The capture system 100 may be used to relieve pressure from a reactor pressure vessel (RPV) 2 within the primary containment 3, especially in the case where a severe plant accident causes fuel cladding barriers 1 to fail. By releasing radioactive materials (gases, liquids and fission products) from the RPV 2, the structural integrity of the primary containment 3 may be spared in order to avoid a more serious plant accident. The capture system may include a large, on-site media area 4 that may be excavated from the natural geological media 13 and located below grade 12. The media area 4 may be filled with media 4a, which is described in more detail herein. The media 4a may assist in the adsorption, absorption and/or reaction of the radioactive material with the media material, allowing the radioactive material a period of time to decay (on-site) while shielding plant personnel and the public from the effects of the radioactive material.

Figure 1C:
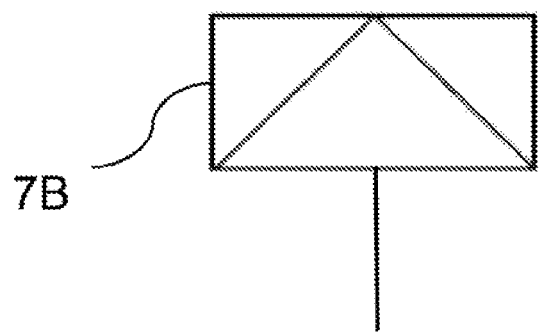
FIG. 1C is a diagram of another alternative venting system, in accordance with an example embodiment.
Figure 1D:
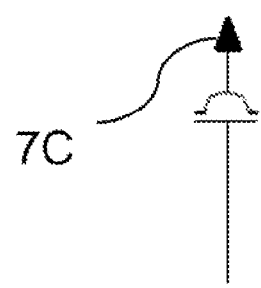
FIG. 1D is a diagram of another alternative venting system, in accordance with an example embodiment.

The capture system 100 may include radioactive capture discharge piping 5 connecting the RPV 2 and portions of primary containment 3 to the media area 4. A discharge valve 6 may be used to allow for the release of radioactive materials to the media area 4. A venting system 7 may be connected to the media area 4 via gas outlet pipe 14, allowing gaseous pressure to be released to the atmosphere to reduce the pressure of the media area 4. The venting system 7 may be a filtered hardened containment vent, or other such well-known system that filters gaseous radioactive materials prior to release into the atmosphere. The venting system may also include a safety relief valve 7A (FIG. 1B), a rupture disc 78 (FIG. 1C), or a bursting disc 7C (FIG. 1D).

A liquid, outlet pipe 15 and liquid outlet valve 15a may be included near a bottom portion of the media area 4 to drain liquid that has been filtered via the media 4a. A treatment system 8, such as a temporary pump-and-treat system may also be provided above grade 12. The temporary treatment system 8 may be temporarily installed following stabilization of a severe accident. The temporary treatment system 8 may include a pump 9 that pumps a treatment liquid through treatment inlet pipe 10 and into the media area 4. By pumping a treatment liquid into the media area 4, the media area 4 may be flooded and pressurized, allowing a treatment discharge pipe 11 to discharge the treatment liquid into the treatment system 8 for further processing and neutralization, as described herein in more detail.

FIG. 2 is a detailed view of a below-grade media area 4 of a capture system 100. The media area 4 may include media 4a of varying granule size. Specifically, the granule size of the media 4a may become progressively smaller along the flow path of radioactive material that is defined by the media area 4 (varying from large media granules 4a1, to less large granules 4a2, to small granules 4a3 and fine granules 4a4). For example, the large media granules 4a1 may be rock, lining a bottom portion of the media area 4, whereas the fine granules 4a4 may be sand. The media 4a2144a4 between the rock and sand may be media with particle sizes between rock and sand. The media 4a may also be resins, silica, beads, stones, or other capture agents. By varying the media 4a granule sizes, radioactive material discharged into the media area 4 (via discharge pipe 5) may encounter varying levels of adsorption/absorption (from low absorption to high absorption) as the radioactive materials approach grade 12.

FIG. 2C is a detailed view of a lower discharge pipe portion 5a of FIG. 2, in accordance with an example embodiment. Specifically, the discharge pipe 5 may include a lower discharge pipe portion 5a that may run horizontally along a bottom portion of the media area 4. The lower discharge pipe portion 5a may include holes 5a1 on top of the pipe portion 5a that may allow gases 20 to escape and rise above the pipe portion 5a. The released gas 20 may rise through the media 4a to be adsorbed/absorbed throughout the varying media grades (4a1-4a4). The lower discharge pipe portion 5a may also include holes 5a2 on the bottom of the pipe portion 5a that allow discharged liquid 21 to flow away from the pipe portion 5a via gravity.

FIG. 2A is a detailed view of an upper gas outlet pipe portion 14a of FIG. 2, in accordance with an example embodiment. Specifically, the gas owlet pipe 14 may include an upper gas outlet pipe portion 14a which may be a horizontal pipe portion. The upper gas outlet pipe 14a may be located near an upper portion of the media area 4, closer to grade 12. The horizontal pipe portion 14a may include holes 14a1 along a lower surface of the upper gas outlet pipe portion 14a that may allow the gas 20 to enter the pipe portion 14a and flow through the gas outlet pipe 14 and venting system 7.

FIG. 2B is a detailed view of a rubber liner 23 of FIG. 2, in accordance with an example embodiment. Specifically, to further protect the environment from radioactive materials, the media area 4 may include a rubber liner 23, and several inches of fine media granules 4a4 (such as sand) cm both sides of the rubber liner 23, that may offer increased radioactive material adsorption/absorption at the periphery of the media area 4. Adding the rubber liner 23 also assists the media area 4 in being able to hold pressure, which may be advantageous in containing the radioactive material.

In addition to the media 48 adsorbing/absorbing the radioactive material, the media area 4 may also be flooded with water prior to as release of radioactive material into the area 4, in order to serve as a secondary suppression pool. The flooding of the media area 4 would provide additional radioactive material scrubbing as well as reduce the rate of pressurization of the media area 4.

It should be understood that sizing of the media area 4, and a determination of the quantity and surface area of the media 4a within the media area 4, should be determined in order to adequately decrease the radioactivity associated with radioactive material that is associated with a partial or complete meltdown of a nuclear reactor (i.e., worst case nuclear accident). In such an event, the following example fission products may be of most concern to the public.

TABLE 1

PWR Core Inventory Fraction Released into Containment

| Chemical Group | Gap Release Phase | Early In-Vessel Phase | Total |
|---|---|---|---|
| Noble gases | 0.05 | 0.95 | 1.0 |
| Halogens | 0.05 | 0.35 | 0.4 |
| Alkali metals | 0.05 | 0.25 | 0.3 |
| Tellurium metals | 0.05 | 0.05 | 0.05 |
| Barium, strontium | 0.00 | 0.02 | 0.02 |
| Noble metals | 0.00 | 0.0025 | 0.0025 |
| Cerium group | 0.00 | 0.0005 | 0.0005 |
| Lanthanides | 0.00 | 0.0002 | 0.0002 |

TABLE 2

BWR Core Inventory Fraction Released into Containment

| Chemical Group | Gap Release Phase | Early In-Vessel Phase | Total |
|---|---|---|---|
| Noble gases | 0.05 | 0.95 | 1.0 |
| Halogens | 0.05 | 0.25 | 0.3 |
| Alkali metals | 0.05 | 0.20 | 0.25 |
| Tellurium metals | 0.00 | 0.05 | 0.05 |
| Barium, strontium | 0.00 | 0.02 | 0.02 |
| Noble metals | 0.00 | 0.0025 | 0.0025 |
| Cerium group | 0.00 | 0.0005 | 0.0005 |
| Lanthanides | 0.00 | 0.0002 | 0.0002 |

TABLE 3

Aerosol Materials of Principal Interest

| Compound | Density (g/cm$_3$) | Molecular Weight |
|---|---|---|
| Fission Products | | |
| BaO | 5.72 | 153.33 |
| CdI$_2$ | 5.64 | 366.22 |
| Ce$_2$O$_3$ | 6.86 | 328.24 |
| C$_5$BO$_2$ | 3.7 | 175.72 |
| CsI | 4.51 | 259.81 |
| CsOH | 3.68 | 149.91 |
| Cs$_2$MoO$_4$ | 4.3 | 335.76 |
| La2O3 | 6.51 | 325.81 |
| MoO2 | 6.47 | 127.94 |
| SrO | 4.7 | 103.62 |
| SnTe | 6.5 | 246.31 |
| Control Materials | | |
| Ag | 10.50 | 107.87 |
| B$_2$O$_3$ | 2.55 | 69.62 |
| Cd | 8.65 | 112.41 |
| In$_2$O$_3$ | 7.18 | 277.63 |

TABLE 3-continued

Aerosol Materials of Principal Interest

| Compound | Density (g/cm$_3$) | Molecular Weight |
|---|---|---|
| Structural Materials | | |
| FeO | 6.0 | 71.84 |
| MnO | 5.37 | 70.94 |
| Ni | 8.90 | 58.69 |
| SnO$_2$ | 6.85 | 150.71 |
| ZrO$_2$ | 5.89 | 123.22 |
| Fuel Materials | | |
| UO$_2$ (3% $_{235}$U) | 10.96 | 237.9 |
| PuO$_2$ | 11.46 | 271.05 |

Maximum radioactivity is determined by the mass of fission products and fuel materials released from containment. Because of the process of radioactive decay, the amount of total radioactivity decreases significantly within the first few days of an accident. Hence the benefit of the media area 4 to hold the release of radioactive materials of on-site until the Initial decrease in radioactivity allows easier handling of the release.

Because the unique fission products from a typical LWR number over 700, all with different decay constants and concentrations, the design of the capture system 100 may use an aggregated decay constant, which may be easily calculated using data presented for instance in the Nuclear Regulatory Commission (NRC) Reg. Guide 3.54, 'Spent Fuel Heat Generation in an Independent Spent Fuel Storage Installation' (Revision 1). Knowing the decay constant of the radioactive materials, the site meteorological conditions, and the rate of pressure increase in the capture media retaining the radioactive material, the off-site release of radioactive material during the accident may be mitigated or completely avoided. Even in the event that the media 4a becomes pressurized to the design limit of the system, gas may be vented via vent 7 such that an amount of radioactive material released into the atmosphere may be reduced by a factor of between 100 and 10,000,000 (as compared to an expected radioactive release without the use of capture system 100) depending on the design pressure of the capture system 100.

FIG. 3 is a detailed view of another below-grade media area 4 configuration of a capture system 100. The media area 4 may have concrete reinforced walls (or steel, rubber, plastic, or other suitable material) to reduce the size and increase the pressure rating of the media area 4. The media area 4 may contain media 4a of varying granule sizes (from large granule media 4a1 to fine granule media 4a4, similar to FIG. 2). However, the media granules 4a may vary horizontally, rather than vertically (contrary to FIG. 2), to provide an increased level of adsorption 1 absorption as the radioactive materials flow through the media area 4, gas space area 36 may be provided above the very fine media 4a4 for sampling and inspection.

FIG. 3A is a detailed view of baffles 31 of FIG. 3, in accordance with an example embodiment. Specifically, baffles 31 may be used to partition baffle cells 30 that provide a tortuous path for the radioactive material to flow through the media area 4. The baffles 31 may include concrete reinforced rebar 32 (or, alternatively, steel or rubber baffles may be used) surrounded by a barrier coating 33. The baffles 31 may be provided to increase mixing and hold-up time, thereby increasing adsorption/absorption of the radioactive material. The bottom of each baffle cell 30 may include a drainage connection 34 that allows for the drainage of liquid 21 into a sloped drain 35. The drain 35 may include a liquid outlet 15 that drains liquid 21 into a drum 38. Following stabilization of a severe accident, the drum 38 may later be drained or otherwise treated prior to off-site removal of the captured liquid 21.

FIG. 4 is a detailed view of another below-grade media area 4 configuration of a capture system 100. The capture system 100 may include a metal tank 42 that is sloped with respect to horizontal (i.e., the metal tank 42 is sloped relative to a plane that is about perpendicular to the direction of gravity). The tank 42 may include activated alumina ($Al_2O_3$) 41 as the media within the tank 42. Because the tank 42 has the ability to remain pressurized, the tank 42 may be used to remove noble gasses from the radioactive materials. Passive hydrogen recombiners 44 may also be provided near the top of the tank 42 to remove any buildup of dangerous hydrogen gas (Using catalysts) within the tank 42.

The tank 42 may also be tilted at an angle from horizontal (i.e., sloped relative to a plane that is about perpendicular to the direction of gravity), with a liquid outlet pipe 15 connected to the lowest elevation of the tank 42 to drain captured liquid 21 into a drum 38. This allows liquid to flow countercurrent to gas flow and particulate flow within the tank 42.

The vent system 7 may include a pressure gauge 43 providing pressure information to personnel above grade 12. Based on the pressure information, plant personnel may open the vent valve 7a to allow depressurization of the tank 42.

FIG. 4A is a perspective view (view 4A-4A) of a series of tanks 42 manifolded together in parallel (similar to the tank 42 shown by the capture system 100 of FIG. 4) to provide extra system capacity. Specifically, manifold piping 47 may be used to connect tank inlets 46 together. An inlet 46 size may increase (from a smallest inlet 46a closest to the discharge pipe 5, to the largest inlet 46z located furthest from the discharge pipe 5) to balance flow between the tanks 42. A common venting system 7, collecting gas from all of the tanks 42, may also be provided.

Figure 5:
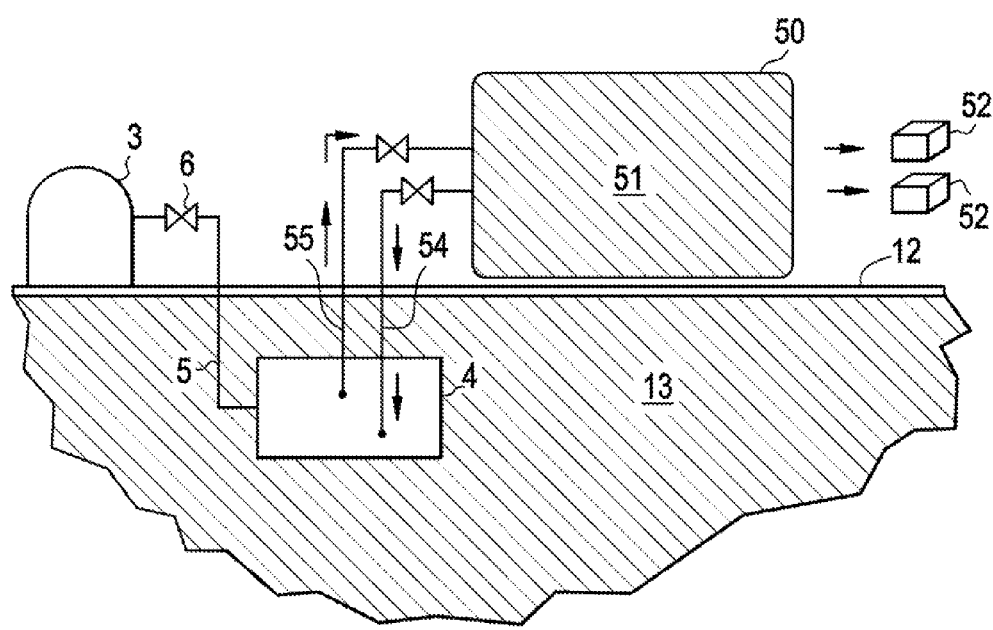
FIG. 5 is a diagram of a treatment facility of a capture system, in accordance with an example embodiment.

FIG. 5 is a diagram of a treatment facility 50 of a capture system 100. The treatment system 50 may be a permanent pump-and-treat system (for instance) existing above grade 12 near the media area 4. The treatment system 50 may be connected to the media area 4 via inlet/outlet pipes 54/55 that provide pressurized treatment liquid to the media area 4. The treatment system 50 may include a treatment media 51, such as activated alumina and humate, used to neutralize and filter the treatment liquid that is returned from the outlet pipe 55. Stabilized solid waste 52 produced by the treatment system 50 may be shipped offsite for long-term storage.

Figure 6:
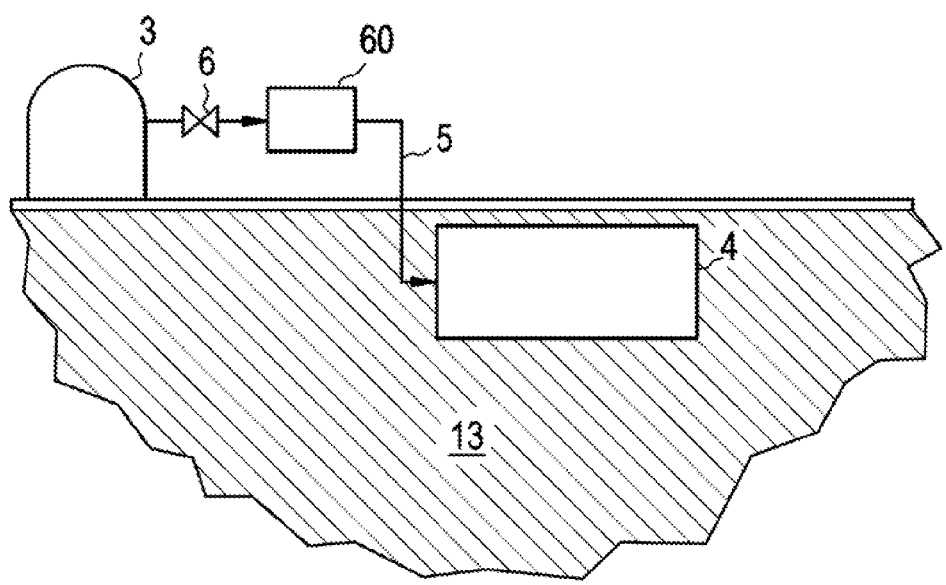
FIG. 6 is another capture system, in accordance with art example embodiment.

FIG. 6 is another capture system 100. The capture system 100 may include a hydrogen mitigation device 60. The hydrogen mitigation device 60 may include an igniter (such as a glow, a spark, or a catalytic igniter, etc.) to control deflagration/detonation of hydrogen, and an optional passive autolytic recombiner. The igniter may provide a deliberate ignition system to mitigate flammable mixtures by displacing hydrogen via controlled or intended deflagration. The igniter 60 may optionally include as passive autolytic recombiner.

Figure 7:
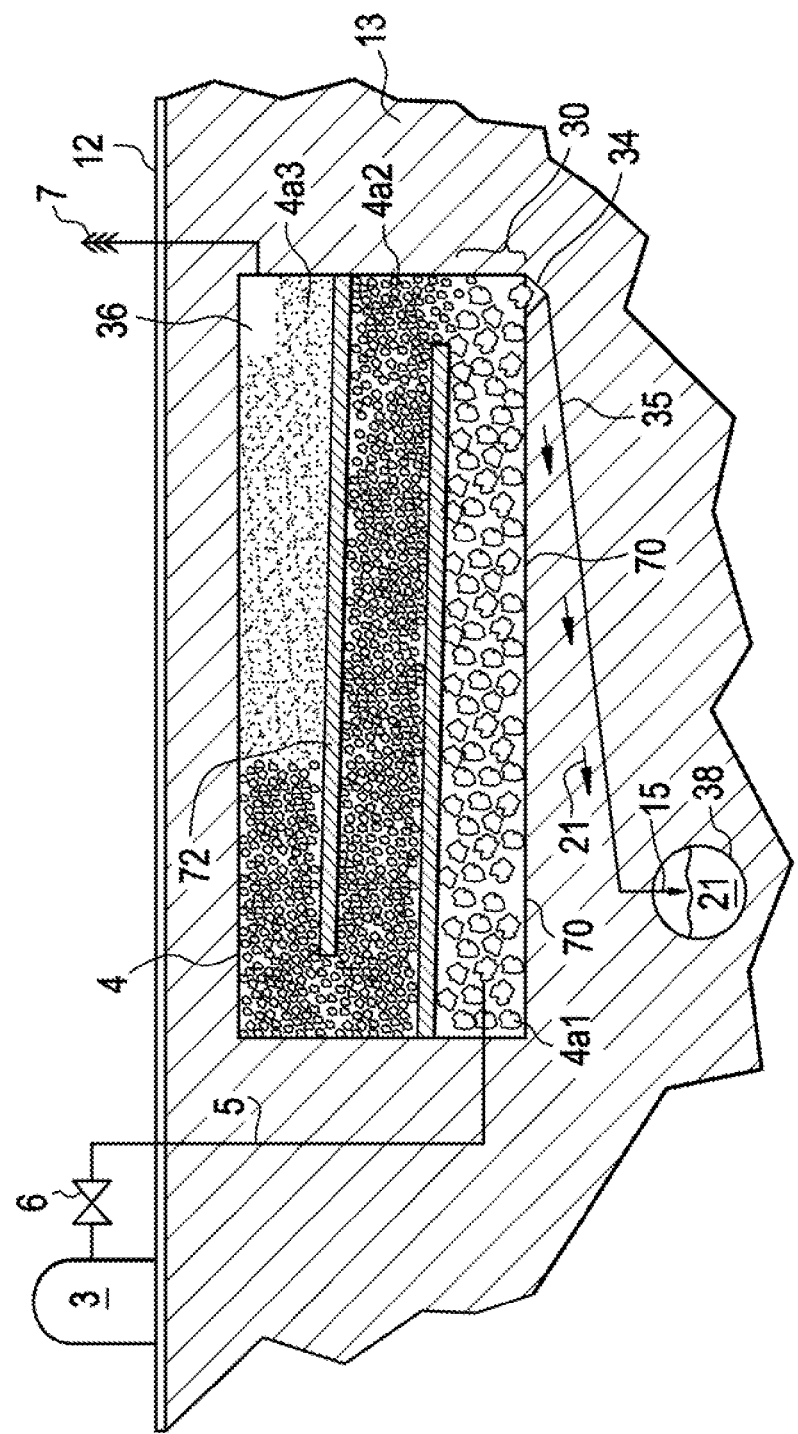
FIG. 7 is a detailed view of another below-grade media area configuration of a capture system, in accordance with an example embodiment.

FIG. 7 is a detailed view of another below-grade media area 4 configuration of a capture system 100. The media area 4 may have concrete reinforced walls (to reduce the size and increase the pressure rating of the media area 4). The media area 4 may alternatively be constructed using a rubber liner, as opposed to concrete reinforced walls. The media area 4 may also include longitudinal baffles 72, thereby creating a vertically oriented tortuous path for the radioactive material. The baffles 72 may be concrete reinforced rebar, thin steel plate, rubber, or any other suitable materials that may withstand the radioactive material for a period of time following a severe plant accident. The baffles 72 allow for flow reversal and pockets of low flows for better capture of radioactive material and mixing. The baffles 72 may be slightly sloped from horizontal (i.e., sloped relative to a plane that is about perpendicular to the direction of gravity) to facilitate drainage of water.

The bottom baffle cell 30 may include a drainage connection 34 that drains liquid 21 into a sloped drain 35 and into drum 38. The bottom surface of the media area 4 may also be slightly sloped (toward drainage connection 34) to further facilitate water drainage. The media 4a may include varying media granule, from a biggest media granule 4a1 to a smallest media granule 4a3, providing increased adsorption/absorption as the radioactive material flows through the media area 4. A gas space area 36 may also be included near the venting system 7 for sampling and inspection.

Figure 8:
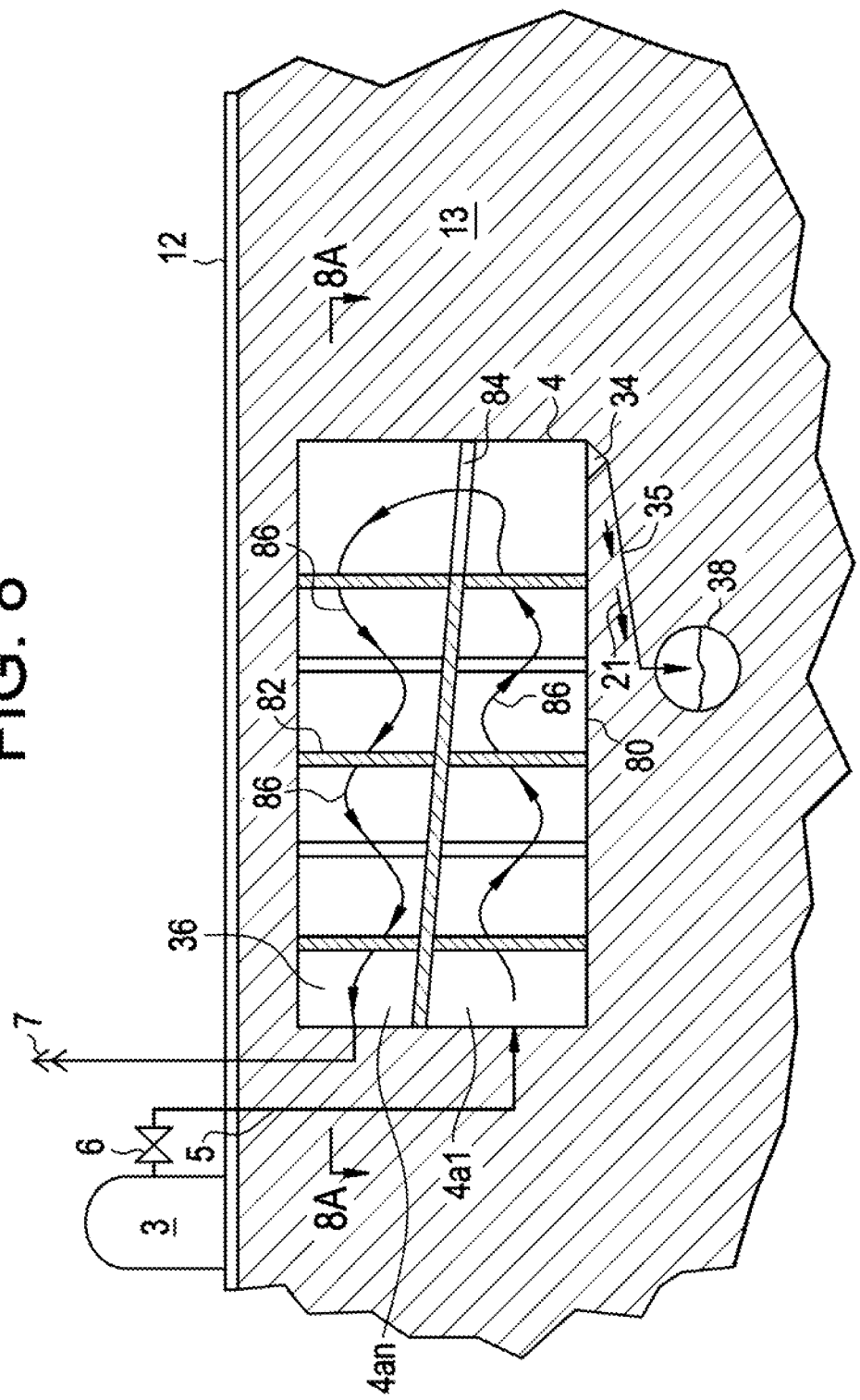
FIG. 8 is a detailed view of another below-grade media area configuration of a capture system, in accordance with an example embodiment.

FIG. 8 is a detailed view of another below-grade media area 4 configuration of a capture system 100. The media area 4 may include longitudinal baffles 84 and transverse baffles 82 (thereby combining features of FIGS. 3 and 7) to provide a particularly tortuous flow path 86 for the radioactive material. Baffles 82/84 may be concrete reinforced rebar, steel, rubber, or other suitable material. The tortuous nature of the longitudinal and transverse baffles 84/82 allow for flow reversals and pockets of low flow for better capture of radioactive material as well as better mixing.

The media area 4 may include concrete reinforced walls, rubber, steel, or other suitable material (understanding that concrete or steel would be more effective in allowing pressurization of the capture system 100). A sloped (from horizontal) drain 35 and drum 38 may be provided. The longitudinal baffles 84 and the floor of the media area 4 may also be sloped (from horizontal) to facilitate water drainage. A gas space area 36 may be included for sampling and inspection.

Media 4a within the media area 4 may have varying granule sizes, such that the media 4a1 closest to the discharge pipe 5 may have the largest granules, and the media 4an closest to the vent system 7 have the smallest granule sizes. This allows the radioactive material to experience increased levels of adsorption/absorption as the radioactive material travels through the media area 4.

Figure 8A:
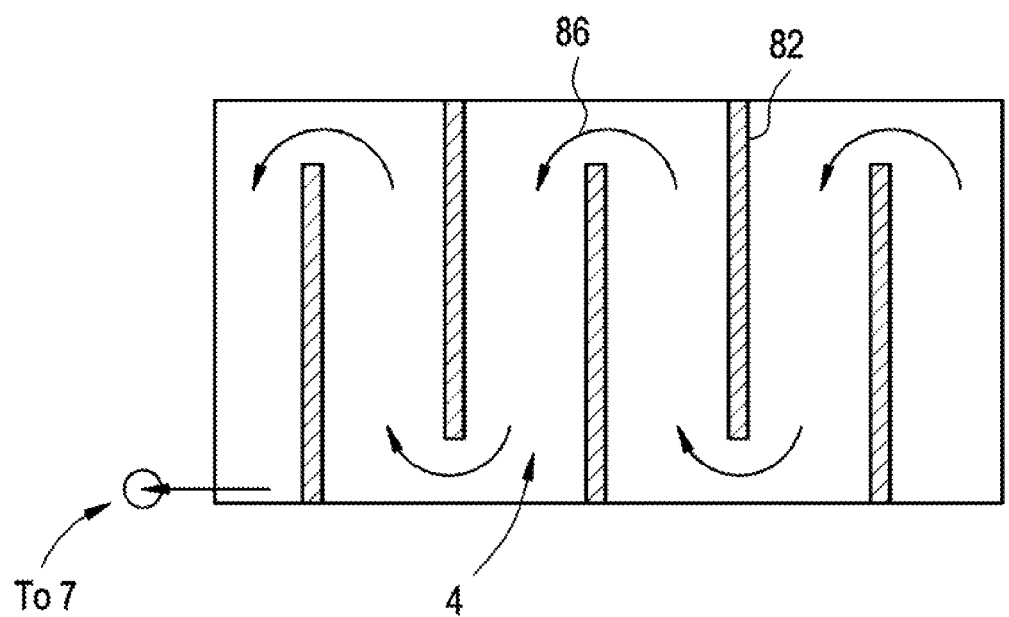
FIG. 8A is a perspective view of the below-grade media area configuration of the capture system of FIG. 8, in accordance with an example embodiment.

FIG. 8A is a perspective view (view 8A-8A) of the below-grade media area 4 configuration of the capture system 100 of FIG. 8. FIG. 8a shows the tortuous flow path 86 moving around the transverse baffles 82.

FIG. 9 is a flowchart of a method of making and using a capture system. In step S90, the method may include excavating a below-grade media area near a primary containment structure of a nuclear reactor. In step S92, the method may include filling the media area with media. In step S94, the method may include fluidly connecting primary containment to the media area via a discharge pipe. And finally, in step S96, the method may include transferring radioactive material from primary containment into the media area. These method steps may be applied to any of the example embodiments shown in FIGS. 1-8a.

It should also be understood that features of the example embodiments shown in FIGS. 1-9 (and described above) may be combined with each other. For instance, the example embodiment media areas may be combined with any of the gas venting systems, any of the temporary or permanent treatment systems, and any of the liquid drainage systems.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A capture system, comprising:
a media area located below-grade and near a primary containment structure of a nuclear reactor;
granular media within the media area;
discharge piping configured to fluidly connect the media area to the primary containment structure, a distal end of the discharge piping being located in the media area; and
a gas outlet pipe coupled to the media area,
wherein the granular media has a granular size, the granular size of the granular media decreasing between the distal end of the discharge piping and the gas outlet pipe.

2. The capture system of claim 1, wherein the granular media includes at least one of rock, sand, resin, silica, beads, stones and activated alumina.

3. The capture system of claim 1, wherein walls of the media area include at least one of natural geological media, a rubber liner, plastic, sand, concrete, rebar reinforced concrete, and steel.

4. The capture system of claim 3, further comprising:
baffles connected to the walls of the media area.

5. The capture system of claim 4, wherein the baffles include at least one of transverse and longitudinal baffles.

6. The capture system of claim 5, wherein the longitudinal baffles are sloped relative to a plane that is about perpendicular to the direction of gravity.

7. The capture system of claim 1, wherein a bottom surface of the media area is sloped relative to a plane that is about perpendicular to the direction of gravity.

8. The capture system of claim 1, further comprising:
a valve in the discharge piping.

9. The capture system of claim 1, further comprising:
a liquid outlet pipe fluidly coupled to a bottom portion of the media area, the liquid outlet pipe extending below the media area.

10. The capture system of claim 1, wherein,
the gas outlet pipe is fluidly coupled to a top portion of the media area,
the gas outlet pipe extends above-grade.

11. The capture system of claim 10, further comprising:
a venting system, located above grade and connected to a distal end of the gas outlet pipe.

12. The capture system of claim 11, wherein the venting system includes at least one of a safety relief valve, a rupture disc and a bursting disc.

13. The capture system of claim 12, wherein the venting system further includes a vent valve.

14. The capture system of claim 10, further comprising:
a gas space area located in the media area, the gas outlet pipe being fluidly connected to the gas space area.

15. The capture system of claim 10, further comprising:
a lower discharge pipe in the media area and connected to the distal end of the discharge pipe;
an upper gas outlet pipe in the media area and connected to the gas outlet pipe, the upper gas outlet pipe being located along the top portion of the media area;
a flow path defined by the media area, the flow path existing between the lower discharge pipe and the upper gas outlet pipe and configured to convey radioactive material between the lower discharge pipe and the upper gas outlet pipe.

16. The capture system of claim 15, further comprising:
the radioactive material, wherein the radioactive material includes at least one of gas, liquid and particulate material.

17. The capture system of claim 15, wherein the granular size of the granular media decreases along the flow path from the lower discharge pipe to the upper gas outlet pipe.

18. The capture system of claim 15, further comprising:
holes being defined in lower surfaces of the upper gas outlet pipe and lower and upper surfaces of the lower discharge pipe,
the upper gas outlet pipe running horizontally along the top portion of the media area,
the lower discharge pipe running horizontally along a bottom portion of the media area.

19. The capture system of claim 5, wherein the baffles define baffle cells, the capture system further comprising:
drainage connections along a bottom surface of baffle cells located at a lower elevation of the media area.

20. The capture system of claim 9, further comprising:
a sloped drain located below the media area and fluidly coupled to the liquid outlet pipe; and
a drum located below the sloped drain and fluidly coupled to the sloped drain.

21. The capture system of claim 10, wherein the media area includes two or more metal tanks, the capture system further comprising:
an inlet connection on each metal tanks;
first manifold piping connecting the inlet connections to the discharge piping; and
an outlet connection on each metal tank, the outlet connections being connected to the gas outlet pipe; and
second manifold piping connecting the outlet connections to the gas outlet pipe.

22. The capture system of claim 21, further comprising:
hydrogen recombiners located near a top portion of each of the metal tanks.

23. The capture system of claim 1, further comprising:
a hydrogen mitigation device in the discharge piping and located above grade, the hydrogen mitigation device including at least one of an igniter and a passive autolytic recombiner.

24. The capture system of claim 1, further comprising:
a treatment system located above grade and positioned above the media area, the treatment system being a pump-and-treat system.

25. The capture system of claim 24, further comprising:
a treatment media within the treatment system, the treatment media including at least one of activated alumina and humate.

26. A method of capturing radioactive material with the capture system of claim 1, comprising: transferring radioactive material from the primary containment structure to the media area.

27. The capture system of claim 3, further comprising:
baffles connected to the walls of the media area and being configured to define a tortuous flow path through the media area, the capture system being configured to convey radioactive material from the primary containment structure through the tortuous flow path within the media area.

28. The capture system of claim 27, wherein the baffles include at least one of transverse and longitudinal baffles.

29. The capture system of claim 27, further comprising:
the radioactive material, wherein the radioactive material includes at least one of gas, liquid and particulate material.

30. The capture system of claim 27, wherein the granular size of the granular media decreases along the tortuous path.

31. The capture system of claim 27, wherein the baffles are configured to define the tortuous path such that at least a portion of the radioactive material travels in a first vector direction and a second vector direction through the tortuous path, the first vector direction being about 180 degrees from the second vector direction.

32. The capture system of claim 27, wherein the baffles are configured to define the tortuous path such that at least a portion of the radioactive material is re-directed at least once while being conveyed through the tortuous path, a re-direction angle of the re-directed radioactive material being about 180 degrees.

33. The capture system of claim 27, wherein the baffles are configured to define the tortuous path such that at least a portion of the radioactive material is re-directed a plurality of times while being conveyed through the tortuous path, a re-direction angle of each of the turns of the re-directed radioactive material being about 180 degrees.

\* \* \* \* \*